United States Patent

Marc et al.

[11] Patent Number: 5,851,035
[45] Date of Patent: Dec. 22, 1998

[54] SELF-LOCKING UNION FOR PIPES

[75] Inventors: Jean-Pierre Marc, Nangis; Bernard Barré, Alfortville, both of France

[73] Assignee: JPB Systeme, Brie Comte Robert, France

[21] Appl. No.: 619,563

[22] PCT Filed: Sep. 28, 1994

[86] PCT No.: PCT/FR94/01136

§ 371 Date: Mar. 27, 1996

§ 102(e) Date: Mar. 27, 1996

[87] PCT Pub. No.: WO95/09317

PCT Pub. Date: Apr. 6, 1995

[30] Foreign Application Priority Data

Sep. 29, 1993 [FR] France .................................. 93 11612

[51] Int. Cl.⁶ .................................................. F16L 55/00
[52] U.S. Cl. .............................. 285/86; 285/92; 285/906
[58] Field of Search .............................. 285/86, 92, 906

[56] References Cited

U.S. PATENT DOCUMENTS

| 4,655,482 | 4/1987 | Myers et al. . | |
|---|---|---|---|
| 4,940,260 | 7/1990 | Odriozola | 285/92 X |
| 5,083,819 | 1/1992 | Bynum . | |
| 5,186,501 | 2/1993 | Mano . | |
| 5,188,398 | 2/1993 | Parimore, Jr. et al. . | |
| 5,348,349 | 9/1994 | Sloane | 285/86 X |

FOREIGN PATENT DOCUMENTS

| 577404 | 6/1959 | Canada | 285/86 |
|---|---|---|---|
| 917287 | 12/1946 | France | 285/86 |
| 693517 | 7/1953 | United Kingdom . | |

*Primary Examiner*—Dave W. Arola
*Attorney, Agent, or Firm*—Young & Thompson

[57] ABSTRACT

A pipe coupling comprising a first and second pipe and a nut cooperating with the thread joint of one of the end pieces of one of the pipes by drawing against the latter a second endpiece belonging to the other pipe. A movable locking member, biased by a spring, comprises a shaped portion which in a locking position, fits onto a complementary shaped portion of the nut, thereby preventing the latter from turning in relation to the endpiece onto which it is screwed. The locking element is slidingly mounted on a support member which is fitted onto the first pipe so as to extend about the thread joint, wherein a sufficient radial distance is maintained with the latter to allow for the passage of the nut. The coupling is suitable for fitting, and even retrofitting, to standard couplings, especially of the nipple-nut type.

21 Claims, 4 Drawing Sheets

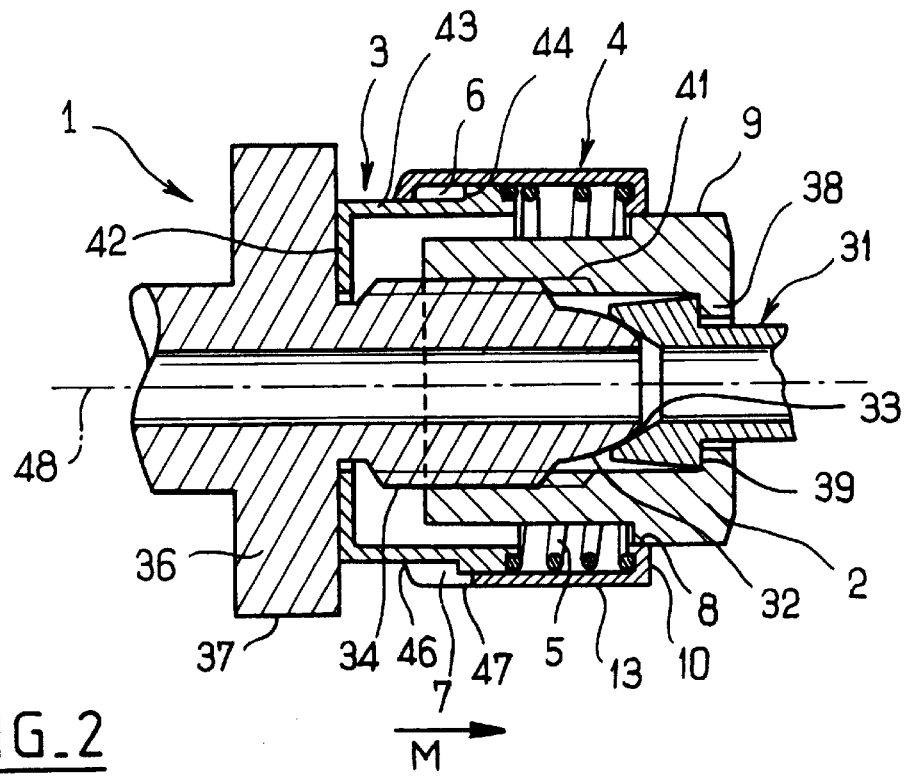
FIG_2
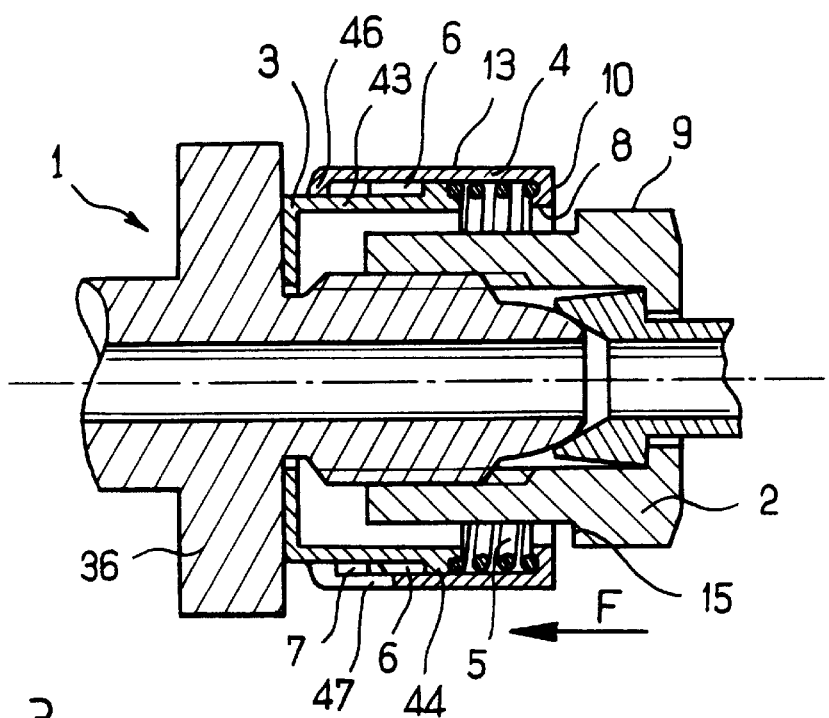
FIG_3

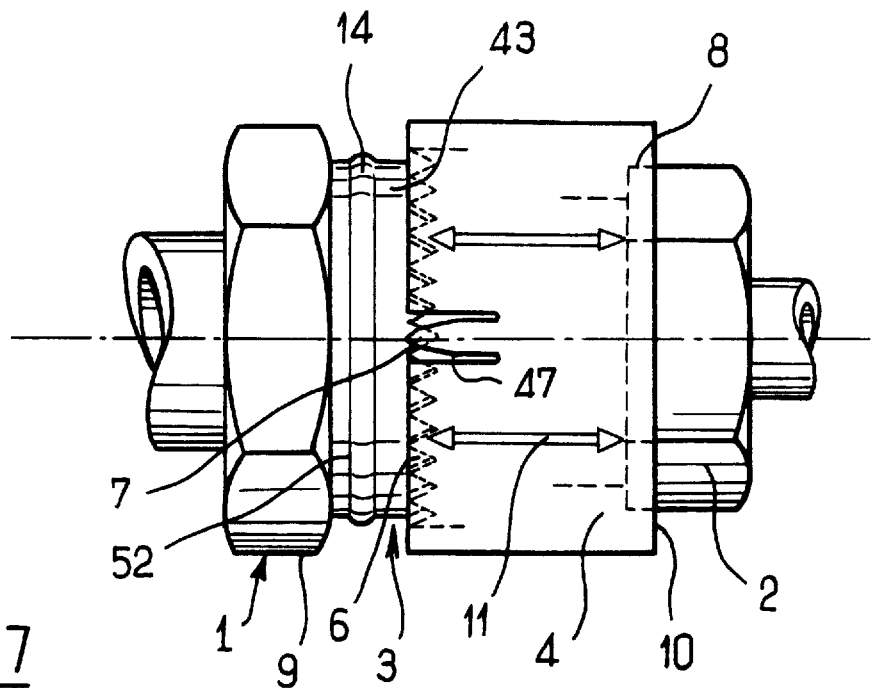
FIG_7
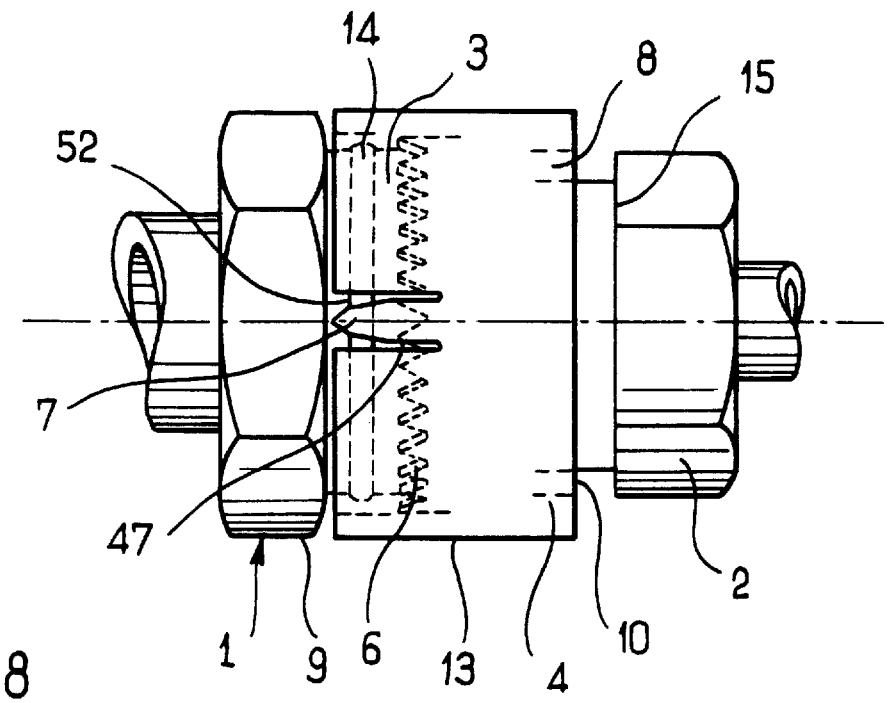
FIG_8

SELF-LOCKING UNION FOR PIPES

FIELD OF THE INVENTION

The present invention relates to a device for mechanically locking a coupling between two pipes.

The invention relates more particularly, but not in a limiting manner, to standardized couplings having a nipple at the end of one of the pipes, intended to be pressed into a flaring at the end of the other pipe under the effect of tightening a captive nut of one of the pipes engaging with a thread formed on the other pipe.

BACKGROUND OF THE INVENTION

Several braking or locking techniques are used at present:

the locking thread technique. This technique, which is much used in the aeronautical field, does not guarantee the mechanical holding together of the assembly. This locking system is more moral than mechanical.

locking techniques using a plastic washer set into the nut, using an elastic or deformed nut, using an elastic washer or using friction. These systems either limit the assembly clearance between the thread of the nipple and the nut, or they increase the torque necessary for loosening. They do not therefore totally guarantee against the risk of the installation becoming loosened during its use.

Most of these techniques cannot be used again after a dismantling.

Another locking technique is known from U.S. Pat. No. 5,083,819, according to which locking tabs fixed to the nipple press elastically against the nut. This technique is expensive.

Furthermore, a locking device is known from FR-A-917 287 in which a locking member slides on splines formed before the thread on the pipe carrying the thread. The locking member is biassed by a spring such that it immobilizes the nut carried by the other pipe. This device is not compatible with the standard couplings since it requires the provision of splines between the thread and the actual piping. The total length of the coupling is modified by this and the total cost is very high. The device according to U.S. Pat. No. 5,188,398 is of the same type but has the additional disadvantage that the splines of the locking member must be strong because they also serve to transmit the tightening torque.

According to U.S. Pat. No. 4,655,482, the nut and the hexagonal comformation of the other pipe are used to rotationally immobilize locking parts which fit over them. The hexagonal conformations of the pipe are therefore no longer accessible for the tightening operation. To overcome this, the locking parts have external hexagonal conformations. The radial dimension is increased by the locking parts, which must furthermore transmit the tightening torque.

SUMMARY OF THE INVENTION

The purpose of the present invention is therefore to propose a locking device for a pipe coupling which is effective, economical and compatible with many standards, without substantially modifying the overall size of the coupling.

According to the invention, the device for mechanically locking a coupling between two pipes terminated by sealing conformations, a first of the pipes carrying a thread or the like before its sealing conformation and the other pipe carrying a rotary nut for cooperating with the thread or the like, the locking device comprising a locking element which is longitudinally movable with respect to the first pipe, a return means biassing the locking element from a withdrawn position releasing the nut towards a locking position in which, when the two pipes are coupled, a locking shaped portion of the locking element cooperates with a complementary shaped portion of the nut, and retaining means to prevent the locking element from rotating in the sense of unscrewing the nut with respect to the first pipe when the locking element is in the locking position, is characterized in that the retaining means provide retention of the locking member with respect to a support member intended to be permanently fixed to the first pipe and extending around the thread, with a sufficient radial distance between the support member and the thread to allow the nut to cooperate with the thread.

The support member which is positioned around the thread has the double advantage of increasing neither the overall size in the lengthwise direction nor in most cases the overall bulk in the radial direction of the pipe, and of being able to be attached very easily as an element fitted onto the pipe.

The locking member cooperates with the support member, and not directly with the pipe, which therefore does not have to be modified for this purpose. As the support and locking members do not have to transmit large forces, they can be relatively economical, thin and light. It is preferable that the spring should be sufficiently weak to allow manual compression.

The device can be used again after each removal of the nut. The dimensions and the longitudinal travel of the locking member make it possible for the shaped portion of the locking member, after tightening the nut, to engage on the complementary shaped portion of the nut and, before loosening the nut, to greatly clear the nut by manually compressing the locking member against the action of the return means.

It is advantageous that the locking member, when it is in the withdrawn position, has freedom of rotation with respect to the support member. The movement into the locking position simultaneously causes an engagement between the support and locking members and the engagement of the shaped portions of the locking member and of the nut.

The engagement can preferably take place in several relative angular positions, by choice, of the locking member with respect to the support member. This makes it possible to adapt the angular position of the locking member to the position assumed by the nut at the end of tightening and thus avoids having to adapt the degree of tightening of the nut in order to give the nut a convenient position for the mutual engagement of the shaped portions of the nut and of the locking member.

If the locking member, when it is in the withdrawn position, has total freedom of rotation with respect to the support member, the engagement means can consist of a kind of free wheel allowing the locking member to rotate in the direction of tightening the nut but not in the direction of loosening it. For this purpose, one of the support and locking members can comprise a set of teeth comprising asymmetrical teeth, and the other one of these members can comprise complementary teeth or simply one or more isolated teeth. The spring allows the teeth of the two members to ride over each other like a ratchet in the direction of tightening the nut. On the contrary, in the direction of loosening, the teeth come to a stop against each other by high-slope faces.

It is preferable that stop means, constituted by the engagement means or produced separately, define the longitudinal position of the locking member when it is in the locking position.

It is advantageous that holding means should hold the locking member in a detachable manner in the withdrawn position in order to allow the operator to stop holding the locking member, thereby to work freely on the nut.

This holding means can in particular be achieved by a slight cylindrical bulge in the rear section of the support member in order that one or more pins of the locking member engage lightly by elasticity behind this bulge. If the retaining means are of a type which release the locking member in rotation with respect to the support member when the latter is in the withdrawn position, these pins can be constituted by teeth which also have the function of forming, between the support and locking members, an engagement preventing the locking member from rotating with respect to the support member when the locking member is in the locking position. According to a variant, the holding function can be provided by engaging such pins, by rotating the locking member, in one or more gaps associated with each group of teeth which must cooperate with a particular pin.

This holding means must hold only at the time the operator is working on the nut. The operator must return the locking member to the locking position after tightening the nut. If the operator forgets to do this, it is preferable that the system can, by the combined effect of the spring and the vibrations of the pipe-work in use, return itself to the locked position. In such a case, if the shaped portions of the locking member and of the nut do not fit together spontaneously, one face of the locking member nevertheless locks the nut due to the thrust of the spring.

This external face of the locking member can have a rough surface state in order to further increase the loosening torque of the nut.

In order to minimize the radial dimension of the device, it is advantageous that the spring should bear against a free end of the support member. In this way, the radial thickness of the spring is placed within the projection of that of the support member, and the spring allows free passage to the nut cooperating with the thread.

It is advantageous that the outside of the locking member should have a surface state allowing handling without the operator's fingers slipping.

Certain engravings on the locking member can indicate the shape and position of the shaped portion with respect to the head of the nut in order to facilitate the passage into the locking position.

Other features and advantages of the invention will furthermore emerge from the following description relating to non-limiting examples.

BRIEF DESCRIPTION OF THE DRAWINGS

In the accompanying figures:

FIG. 1B is an enlarged fragment of FIG. 1A;

FIGS. 2 and 3 are two axial cross-sectional views of the device shown in FIG. 1, when the locking member is in the locking position and in the withdrawn position respectively;

FIGS. 7 and 8 are side elevation views of a fourth embodiment of the invention, when the locking member is in the locking position and in the withdrawn position respectively.

DESCRIPTION OF THE PREFERRED EMBODIMENTS

Figure 1A:
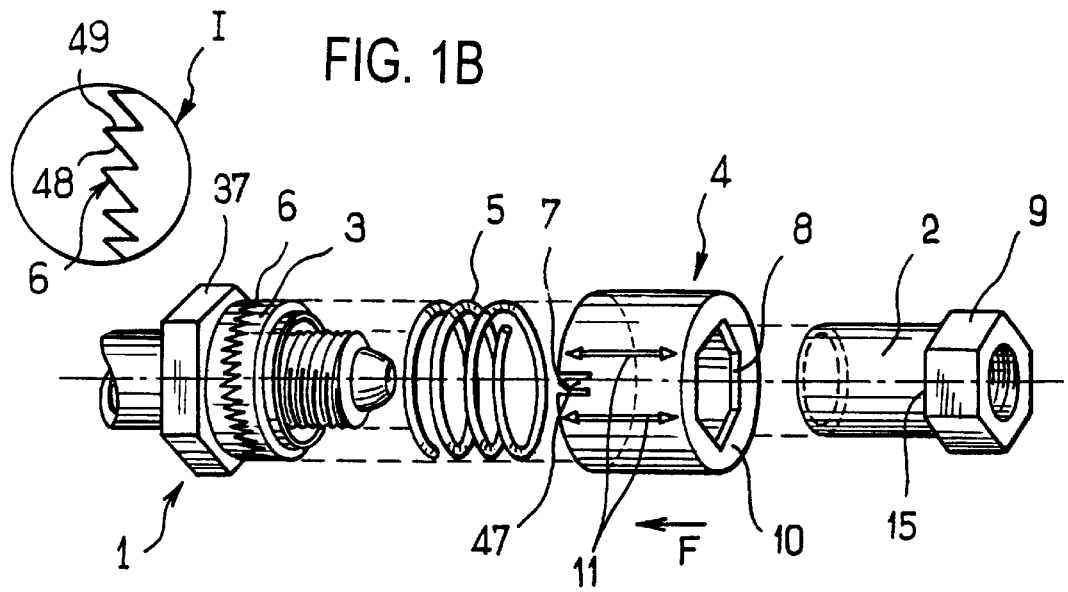
FIG. 1A is a partially exploded, perspective view of a first embodiment of the invention, the pipe associated with the nut not being shown.

As shown in FIGS. 1 to 3, the locking device according to the invention is adaptable to a pipe coupling comprising a first end-piece 1, or nipple, integral with the first one of the pipes to be connected, and a second end-piece 31, rendered integral with the second one of the pipes to be connected, and a nut 2.

The end-pieces 1 and 31 comprise at their free ends a male sealing shaped portion 32 of ovoid shape and a female sealing shaped portion 33 of truncated cone shape respectively, intended to bear against one another in a fluid-tight manner. Starting from the ovoid sealing shaped portion 32, the nipple 1 comprises a male thread 34 and then a collar 36 carrying on its periphery a rotational grasping conformation such as a hexagonal conformation 37.

The nut 2 comprises at its rear end, remote from the end-piece 1, an internal collet 38 and an external rotational grasping conformation 9 such as a hexagonal conformation. The internal collet 38 engages the second end-piece 31 behind a shoulder 39 of the second end piece 31. The shoulder 39 faces away from the first bad piece 1 in order to retain the nut 2 captive and in order to receive from the nut 2 a force ending to press the sealing conformation 33 in a fluid-tight manner against the sealing conformation 32 of the end-piece 1.

The nut 2 furthermore comprises, starting from its front end facing the end-piece 1, a female thread 41 capable of cooperating with the thread 34 of the end-piece 1 in order to produce the previously-mentioned tightening force.

The locking device according to the invention comprises a support member 3, or fixed cup, comprising at its rear end a collet 42 fixed for example by soldering against the front face, facing towards the second end-piece 31, of the collar 36. The periphery of the fixing collet 42 is rigidly connected to the rear end of a skirt 43 which extends towards the second end-piece 31 about the thread 34 of the nipple 1. The diameter of the skirt 43 is sufficient for there to be, between the thread 34 and the internal surface of the skirt 43, an annular gap allowing the penetration by the nut 2 when it is being screwed on the thread 34.

In the vicinity of its free end, facing the end-piece 31, the skirt 43 has on its external periphery an annular collar 44 whose shoulder-face facing away from the end-piece 31 consists of a set of teeth 6 with axially protruding teeth.

The locking device furthermore comprises a locking member 4, or mobile cup, which is fitted onto the skirt 43 of the fixed cup 3 with freedom to slide in the longitudinal direction. In order to allow this, the mobile cup 4 has a cylindrical wall whose internal diameter corresponds to the external diameter of the collar 44 of the fixed cup 3 and has at its end facing the first end-piece 1 a rim 46 for sliding substantially without play over the skirt 43 beyond the collar 44. At the same time, due to the rim 46, the mobile cup 4 is rendered captive to the fixed cup 3 and the longitudinal sliding motion of the mobile cup 4 with respect to the fixed cup 3 is limited by the rim 46 coming to a stop against the collar 44.

As shown better in FIG. 1A, in at least one place in the periphery of its rear edge (FIG. 1A), the mobile cup 4 carries two axial slots defining between them a tongue 47 having a certain flexibility and carrying, on its face facing radially inwardly, a tooth 7 which engages in the teeth 6 of the fixed cup 3 when the mobile cup 4 is in the locking position shown in FIG. 2. Because of this engagement, the mobile cup 4 is prevented from rotating with respect to the fixed cup 3 about the axis 48 of the device.

On the other hand, in the withdrawn position of the mobile cup 4, shown in FIG. 3, in which the mobile cup 4 is pushed back towards the collar 36 of the nipple 1, the rim 46 of the mobile cup 4 is axially separated from the collar 44 of the fixed cup 3 and the tooth 7 is disengaged from the teeth 6.

At its end facing the end-piece 31, the mobile cup 4, which is of generally cylindrical shape, has a collet 10 defining by its radially internal periphery a hexagonal orifice 8 constituting a hexagonal shaped portion which is complementary to the hexagonal shaped portion 9 of the nut 2. When the nut 2 is tightened on the thread 34 of the nipple 1 and the mobile cup 4 is in the locking position shown in FIG. 2, the shaped portion 8 of the mobile cup 4 is fitted on the complementary shaped portion constituted by the hexagonal conformation 9 of the nut 2. This immobilizes the nut 2 in opposition to any rotation relative to the nipple 1, by the intermediary of the mobile cup 4 which is itself prevented from rotating with respect to the fixed cup 3 by the engagement of the tooth 7 in the teeth 6.

On the contrary, when the mobile cup 4 is in its withdrawn position as shown in FIG. 3, the shaped portion 8 of the mobile cup 4 releases the hexagonal conformation 9 of the nut 2 and thus allows the nut 2 to be screwed or unscrewed with respect to the nipple 1.

A compression coil spring 5 is fitted between the collar 44 of the fixed cup 3 and the collet 10 of the mobile cup 4 in order to bias the mobile cup 4 towards its locking position, in the direction M (FIG. 2). Because of this, the locking is carried out and maintained automatically once the nut has been tightened. If the operator carries out the locking with care, he chooses an appropriate angular position of the mobile cup 4 about the axis 48 by rotating the mobile cup 4 with respect to the fixed cup 3 in the withdrawn position, then he leaves the spring 5 to push the mobile cup 4 into the locking position. If, on the contrary, the operator leaves the spring 5 to push the mobile cup 4 towards the nut 2 without taking any particular precaution with regard to the angular position of the mobile cup 4, the shaped portion 8 of the fixed cup 3 and the shaped portion 9 of the nut 2 will not necessarily be in correctly aligned angular positions but there will however be a certain locking effect produced between the nut 2 and the mobile cup 4 whose tooth 7 is already engaged in the teeth 6 of the fixed cup 3. If, despite this, the nut tends to loosen, it will quickly reach a position in which the fixed cup 3 would be able to move into the full locking position and any additional loosening would be prevented.

In order that the locking effect between the locking cup 4 and the nut 2 would be substantial in the event of incomplete locking, the external face of the collet 10 and the shoulder 15 (FIGS. 1 and 3) of the nut 2 against which it will rub can have a rough surface state, or irregularities, or any other constitution capable of increasing the coefficient of friction between them.

The locking device according to the invention can be embodied as a subassembly comprising the fixed cup 3, the mobile cup 4 and the spring 5. This subassembly can then be fitted as one piece over the nipple 1 from its free end until the collet 42 comes to bear against the collar 36 and is appropriately fixed, for example by means of soldering. Consequently, the locking device according to the invention can be fitted to standard and even to pre-existent piping.

In a variant illustrated by FIG. 1B, the teeth 6 can be asymmetrical in order to allow rotation of the mobile cup 4 in the sense of screwing up the nut 2 even when the mobile cup 4 is in the locking position, because of a relatively shallow slope of the faces 48 of the teeth against which the tooth 7 bears in this direction of rotation. On the contrary, the other face 49 of the teeth 6 is very steep in order to prevent the mobile cup 4 from rotating in the sense of unscrewing the nut 2 when the mobile cup 4 is in the locking position. The use of the device is thus simplified because it is no longer necessary to put the mobile cup 4 in the withdrawn position manually in order to be able to tighten the nut 2. The mobile cup 4 allows itself to be rotated in the sense of tightening the nut. On the contrary, it is necessary to move the cup 4 into the withdrawn position in order to carry out a loosening operation.

As shown in FIG. 2, when the mobile cup 4 is in its natural locking position because of the action of the return spring 5, it extends axially more or less up to the free end of the nipple 1 and consequently the fixed cup 3 and the mobile cup 4 are capable of jointly providing protection to the nipple 1 and in particular to the thread 34 and the sealing conformation 32 when the two pipes are uncoupled, in particular with respect to mechanical damage.

The spring 5 is also protected. Furthermore, when the two pipes are coupled, the fixed 3 and mobile 4 cups protect the coupling assembly and the spring. On the contrary, the hexagonal conformation 37 of the end-piece 1 always remains accessible.

The external surface state of the mobile cup 4 is made non-slip in order to facilitate good manual grasping in order to apply a force in the direction F (FIGS. 1 and 3). Markings 11 (FIG. 1) such as arrows can be engraved to indicate the direction of locking and unlocking.

Figure 4:
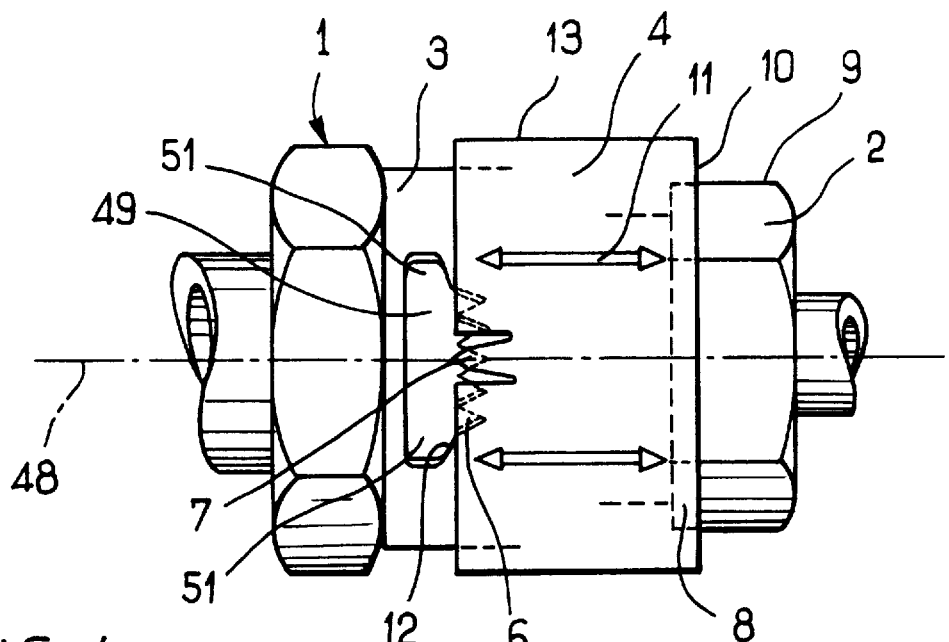
FIGS. 4 and 5 are two side elevation views of a second embodiment of the locking device, when the locking member is in the locking position and in the withdrawn position respectively.
Figure 5:
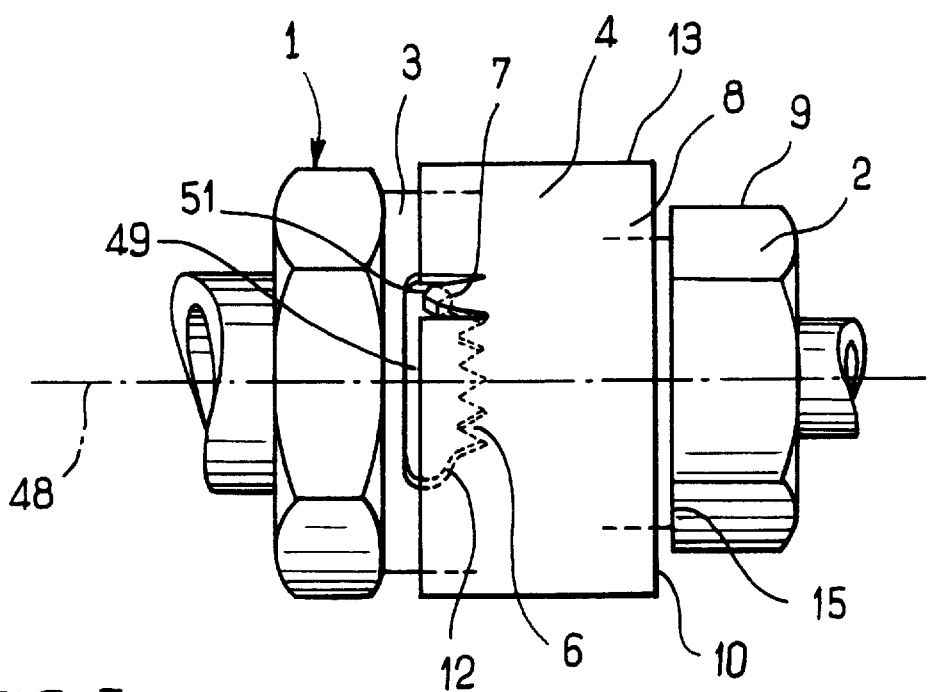

The example shown in FIGS. 4 and 5 will only be described where it differs with respect to the one shown in FIGS. 1 to 3.

The set of teeth 6 no longer extends over the whole of the periphery of the fixed cup 3 but only over a certain angular range about the axis 48 and it forms a section of the periphery of an opening 49 formed in the external lateral wall of the fixed cup 3.

The angular extent of the opening 49 is greater in the region occupied by the tooth 7 when the mobile cup 4 is in the withdrawn position than the distance along the set of teeth 6. This defines two slots 51, each located at one of the ends of the set of teeth 6, which can receive the tooth 7 when the mobile cup 4 has been withdrawn into the withdrawn position as shown in FIG. 5 and then turned through a certain angle. Once this has been done, the tooth bears against a stop edge 12 of the slot 51 which it occupies. Consequently, the cup is held in the withdrawn position against the action of the return spring (not shown in FIGS. 4 and 5) to allow the operator to screw or unscrew the nut 2 without being hindered by the locking cup 4.

The stop edges 12 of the slots 51 have, with respect to the circumferential direction, a certain slope tending to make the tooth 7 slide towards the teeth 6. Thus, the holding of the tooth 7 by the slots 51 is unstable. In particular, if the operator has forgotten to lock the nut 2 after having tightened it, the vibrations and other functional movements which the piping can experience end up by causing the spontaneous return of the mobile cup 4 towards the locking position.

Figure 6:
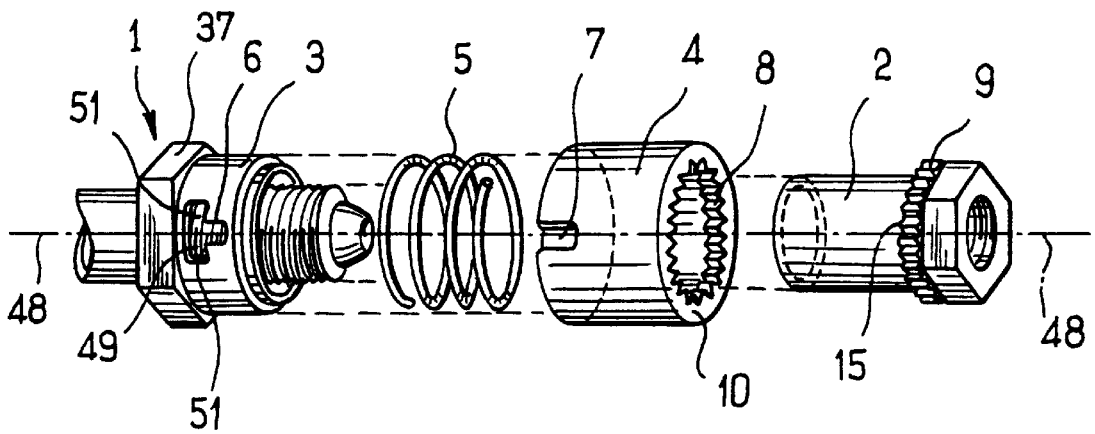
FIG. 6 is a partially-exploded, perspective view of a third embodiment of the invention.

The example shown in FIG. 6 will only be described where it differs from the one shown in FIGS. 4 and 5.

The shaped portion 8 of the mobile cup 4 is formed by a set of teeth of relatively short pitch, whose teeth are oriented towards the axis 48. The shaped portion of the nut 2 consists of a complementary set of teeth 9 which can be formed directly on the nut, or which has been formed on a ring which has then been fitted simply by slipping it over the nut and then fixing it against the hexagonal head.

With shaped portions of such a short pitch, it is no longer strictly necessary to provide several locking positions for the mobile cup 4 with respect to the fixed cup 3. That is why, in the example shown in FIG. 6, in the locking position, the tooth 7 of the mobile cup 4 penetrates into a retaining means consisting of a single recess 6 of corresponding shape.

The recess 6 is part of an opening 49 which is widened circumferentially in the region occupied by the tooth 7 when the mobile cup 4 is in the withdrawn position, in such a way as to form two slots 51, as described with reference to FIGS. 4 and 5.

The example shown in FIGS. 7 and 8 will only be described where it differs from the one shown in FIG. 2.

The skirt 43 of the fixed cup 3 has between the teeth 6 and its rear end, an annular bulge 14 which the tooth 7 must pass over when the mobile cup 4 comes into its withdrawn position. In this way, in the withdrawn position, the mobile cup 4 is engaged in a pawl-like reversible manner behind the slight shoulder 52 formed by the bulge 14 on the side nearest the rear end of the skirt 43 against the action of the return means which are not shown in this figure. This pawl-like engagement is made possible by the flexion of the tongue 47 carrying the tooth 7.

In order to bring the mobile cup 4 into the locking position, it suffices to apply a light force in the direction M (FIG. 8), or to leave the vibrations to act as has been stated above.

The materials used for producing the devices which have just been described are chosen to be sufficiently strong to guarantee utilization which is, in principle, unlimited. In certain technical fields, these materials can be stainless steels having a resistance to operating temperature greater than that required in order to retain the mechanical properties necessary for their functioning such as has just been described, or can even be titanium alloy if the required temperature resistance is important.

The locking device according to the invention is particularly intended for locking nipple-nut pipe couplings used in the mechanical industrial field and more particularly in aeronautics.

The invention is not of course limited to the examples described and shown.

The various improvements described are compatible with each other in ways different from that present in the described embodiments.

It is also conceivable that the mobile cup or other locking member is integral in rotation with the fixed cup or other retaining member even when the locking member is in the withdrawn position. It is not necessary for the holding means to be partly constituted with means also serving for retaining the locking member to prevent rotation with respect to the support member.

It is also possible for the shaped portions of the nut and of the locking member to be permanently engaged, the unlocking function being carried out only between the locking member and the support member when the locking member is in the withdrawn position.

What is claimed is:

1. A device for mechanically locking a coupling between a first pipe and a second pipe, each pipe terminating with a mutually-cooperating sealing conformation, the sealing conformations together forming a seal, the first pipe having a thread positioned before its respective sealing conformation and the second pipe having a rotary nut for cooperating with the thread of the first pipe, a support member permanently fixed to the first pipe against relative movement thereto, the device comprising:

a locking member longitudinally mobile with respect to the first pipe;

a return means for biassing said locking member from a withdrawn position for releasing the nut and towards a locking position in which, when the two pipes are coupled, a locking portion of said locking member cooperates with a complementary portion of the nut; and engagement means for preventing the locking member from rotating in a direction of unscrewing the nut with respect to the first pipe when said locking member is in the locking position, said engagement means retaining said locking member with respect to the support member and extending around the thread of the first pipe, with a sufficient radial distance between the support member and the thread to allow the nut to cooperate with the thread.

2. The device according to claim 1, wherein said return means is fitted between said locking member and the support member.

3. The device according to claim 2, wherein said locking member, the support member and said return means together comprise a subassembly ready to be fitted to the first pipe by the respective sealing conformation, and to be fixed against a shoulder of the first pipe.

4. The device according to claim 1, wherein said return means extend inside said locking member, said locking member comprising a cup slideable over the exterior of the support member, said return means being supported on the support member adjacent a free end thereof, facing the nut.

5. The device according to claim 1, wherein said return means extend inside said locking member, said locking member comprising a cup slideable over the exterior of the support member, said return means bearing against a face of a collar on an external face of the support member, the collar having an opposite face serving as a stop limiting travel of said locking member under action of said return means.

6. The device according to claim 1, wherein the support member and said locking member comprise mutual stop means which limit travel of said locking member with respect to the support member under action of said return means.

7. The device according to claim 6, wherein said stop means include said engagement means, said engagement means ensuring rotational connection between the support member and said locking member when said locking member is in the locking position, said locking member having, when it is in the withdrawn position, a freedom of rotation relative to the support member.

8. The device according to claim 1, wherein said engagement means which, when said locking member is in the locking position, rotationally couple said locking member and the support member and, which, when said locking member is in the withdrawn position, are disengaged and allow a rotation of said locking member.

9. The device according to claim 8, wherein said engagement means include means of achieving the engagement in several angular positions of engagement between said locking member and the support member.

10. The device according to claim 8, wherein said engagement means comprise first teeth on one of the support member and said locking member, the other one of the support member and said locking member comprising at least one second tooth for penetrating into any one of a plurality of gaps between the first teeth, when said locking member moves from the withdrawn position into the locking position.

11. The device according to claim 10, wherein the first teeth are asymmetrical.

12. The device according to claim 8, wherein said engagement means include at least one second tooth, being part of one of the support member and said locking member, and further comprising stop means on the other one of the support and locking members, the at least one second tooth engaging the stop means to hold detachably the locking member in the withdrawn position.

13. The device according to claim 12, wherein the stop means comprise a slot into which the at least one second tooth can engage by rotating the locking member relative to the support member, when the locking member is in the withdrawn position.

14. The device according to claim 12, wherein the stop means comprise a shoulder behind which the at least one second tooth can engage by elastic deformation, when the locking member reaches the withdrawn position.

15. The device according to claim 12, further comprising a shoulder on a peripheral bulge of the support member carrying the stop means.

16. The device according to claim 1, further comprising means for holding the locking member in the withdrawn position.

17. The device according to claim 16, wherein the holding means are a reversible pawl-like engagement.

18. The device according to claim 17, wherein the holding means comprise a second tooth of one of the support and locking members, capable of engaging behind a shoulder of the other one of the support and locking members.

19. The device according to claim 1, wherein the locking portion of the locking member and the complementary portion of the nut are hexagonal.

20. The device according to claim 1, wherein the locking portion of the locking member is a set of teeth and the complementary portion of the nut is a complementary set of teeth.

21. The device according to claim 1, wherein the support member is fixed to the first pipe axially between the thread and a grasping conformation, allowing free access to the grasping conformation.

* * * * *